US007662417B2

(12) United States Patent
Seguer Bonaventura et al.

(10) Patent No.: US 7,662,417 B2
(45) Date of Patent: *Feb. 16, 2010

(54) PRESERVATIVES AND PROTECTIVE SYSTEMS

(75) Inventors: Joan Seguer Bonaventura, Barcelona (ES); Xavier Rocabayera Bonvila, Barcelona (ES); Mariano A. Martinez Rubio, Barcelona (ES)

(73) Assignee: Laboratorios Miret, S.A., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 10/513,554

(22) PCT Filed: May 8, 2002

(86) PCT No.: PCT/EP02/05061

§ 371 (c)(1),
(2), (4) Date: Nov. 5, 2004

(87) PCT Pub. No.: WO03/094638

PCT Pub. Date: Nov. 20, 2003

(65) Prior Publication Data

US 2005/0175747 A1    Aug. 11, 2005

(51) Int. Cl.
*A23L 3/34* (2006.01)
*A21D 4/00* (2006.01)
(52) U.S. Cl. ..................... 426/335; 426/321
(58) Field of Classification Search ................ 426/335, 426/321, 532, 302, 310, 323
See application file for complete search history.

(56) References Cited

U.S. PATENT DOCUMENTS

| 3,825,560 | A | * | 7/1974 | Saito et al. ............... 548/534 |
| 4,389,489 | A | | 6/1983 | Preiss et al. .............. 435/280 |
| 5,336,515 | A | * | 8/1994 | Murphy et al. ............ 426/573 |
| 5,661,149 | A | | 8/1997 | King et al. |
| 5,681,802 | A | | 10/1997 | Fujiwara et al. ........... 510/130 |
| 5,780,658 | A | * | 7/1998 | Martinez-Pardo et al. ..... 554/51 |
| 6,068,867 | A | * | 5/2000 | Nussinovitch et al. ...... 426/102 |
| 6,299,915 | B1 | * | 10/2001 | Nussinovitch et al. ........ 426/89 |
| 7,074,447 | B2 | | 7/2006 | Bonaventura et al. ....... 426/321 |
| 2003/0049305 | A1 | | 3/2003 | Von Rymon Lipinski et al. 424/439 |
| 2004/0166082 | A1 | * | 8/2004 | Urgell-Beltran et al. . 424/70.21 |
| 2004/0175350 | A1 | * | 9/2004 | Urgell Beltran et al. .. 424/70.27 |
| 2004/0254232 | A1 | * | 12/2004 | Beltran et al. ............. 514/400 |
| 2004/0265443 | A1 | * | 12/2004 | Beltran et al. ............. 426/321 |
| 2005/0175747 | A1 | | 8/2005 | Seguer Bonaventura et al. . 426/323 |
| 2006/0003421 | A1 | | 1/2006 | Markussen et al. ......... 435/69.1 |

FOREIGN PATENT DOCUMENTS

| EP | 0 485 616 | | 5/1992 |
| EP | 0 500 332 | | 8/1992 |
| EP | 0 749 960 A1 | * | 12/1996 |
| GB | 1 352 420 | * | 5/1974 |
| JP | 58039651 | | 3/1983 |
| JP | 59164704 | | 9/1984 |
| JP | 03291211 | | 12/1991 |
| JP | 09188605 | | 7/1997 |
| JP | 09255518 | | 9/1997 |
| JP | 09286712 | | 11/1997 |
| JP | 10045557 | | 2/1998 |
| WO | 94/07377 | | 4/1994 |
| WO | 94/19026 | | 9/1994 |
| WO | 94/19027 | | 9/1994 |

(Continued)

OTHER PUBLICATIONS

Chemical Abstracts Service, Columbus, Ohio, US; Garcia Dominguez, J. et al.: "Cationic Surfactants With Antimicrobial Activity" retrieved from STN Database Accession No. 107:79974, XP002196810, Abstract and ES 530 051 A (Consejo Superior De Investigaciones Cientificas, Spain) May 1, 1995.

(Continued)

*Primary Examiner*—Keith D Hendricks
*Assistant Examiner*—Jyoti Chawla
(74) *Attorney, Agent, or Firm*—Renner, Otto, Boiselle & Sklar, LLP

(57) ABSTRACT

This invention relates to compositions comprising cationic preservatives and anionic hydrocolloids, to methods of preparing them and their application in food microbiological protection. Due to their composition, food products are susceptible to act as a culture medium for microorganisms, and this constitutes a possible risk to human health. Thus, food products require good protection against microbiological contamination. The present invention relates to the interaction between cationic preservatives derived from the condensation of fatty acids and esterified dibasic amino acids and anionic hydrocolloids, such as pectins, xanthan gums, carrageenans, acacia gums or agars. The most preferred cationic preservative is the ethyl ester of the lauramide of arginine monohydrochloride (LAE). As a result of this interaction, some anionic hydrocolloids are able to absorb LAE and precipitate together by the enhancement of their lipophilic properties. These new solid compounds can be isolated by filtration and, surprisingly, retain the microbiological inhibitory activity of LAE. The solid compounds contain approximately stoechiometric amounts of LAE and the anionic hydrocolloid. The preferred solid compound is LAE/xanthan gum. The solid compounds are stable and can be stored under normal conditions of temperature and humidity for long periods of time. The invention relates to the method of preserving food products using the new solid compounds and the food products obtained as a result of the application of the method.

16 Claims, No Drawings

FOREIGN PATENT DOCUMENTS

| | | |
|---|---|---|
| WO | 96/21642 | 7/1996 |
| WO | 97/30964 | 8/1997 |
| WO | 01/49121 | 7/2001 |

OTHER PUBLICATIONS

Chemical Abstracts Service, Columbus, Ohio, US; Garcia Dominguez, J. J. et al.: "N. alpha.-Acyl-L-alkylaminoguanidinic Acids and Their Salts as Surfactants With Antimicrobial Action" retrieved from STN Database Accession No. 99:122920, XP002196912, Abstract and ES 512 643 A (Asociacion De Investigacion De Detergentes, Spain) Feb. 16, 1983.

Infante et al., Surface Active Molecules: Preparation and Properties of Long Chain Nα-ACYL-Lα-Amino-ω-Guanidine Alkyl Acid Derivatives; International Journal of Cosmetic Science 6, 1984, pp. 275-282.

Infante et al., A Comparative Study on Surface Active and Antimicrobial Properties of Some Nα-Lauroyl-Lα, ωDIBASIC Aminoacids Derivatives; Fette Seifen Anstrichmittel, No. 8, 1985, pp. 309-313.

Garcia Dominguez et al.; Monocapas De Algunos N-α-Acil Aminoacidos Antimicrobianos En Soluciones De NaCl; Anales de Quimica, vol. 82, 1986, pp. 413-418, English Summary considered.

Infante et al.; The Influence of Steric Configuration of Some Nα-Lauroyl Amino-Acid Derivatives on Their Antimicrobial Activity; Fette Seifen Anstrichmittel, 88, No. 3, 1986, pp. 108-110.

Molinero et al.; Synthesis and Properties of Nα-Lauroyl-L-Argine Dipeptides From Collagen; JAOCS, vol. 65, No. 6, 1988, 4 pages.

Vinardell et al.; Comparative Ocular Test of Lipopeptidic Surfactants; International Journal of Cosmetic Science 12, 1990, pp. 13-20.

Kunieda et al.; Reversed Vesicles From Biocompatible Surfactants, Advanced Materials, No. 4, 1992, pp. 291-293.

Infante et al.; Sintesis Y Propiedades De Tensioactivos Cationicos Derivados De Arginina; Anales de Quimica, vol. 88, 1992, pp. 542-547, English Summary considered.

Fördedal et al.; Lipoamino Acid Association in the System Nα-Lauroyl-L-Arginine Methyl Ester—1-Pentanol—Water As Studied by Dielectric Spectroscopy; Colloids and Surfaces A: Physiochemical and Engineering Aspects, 79, 1993, pp. 81-88.

Infante et al., Non-Conventional Surfactants From Amino Acids and Glycolipids: Structure, Preparation and Properties; Colloids and Surfaces A: Physicochemical and Engineering Aspects 123-124, 1997, pp. 49-70.

Moran et al.; Chemical Structure/Property Relationship in Single-Chain Arginine Surfactants; Langmuir 2001, 17, pp. 5071-5075.

\* cited by examiner

PRESERVATIVES AND PROTECTIVE SYSTEMS

This application is a national phase of International Application No. PCT/EP02/05061 filed May 8, 2002 and published in the English language.

This invention relates to compositions comprising cationic preservatives and anionic hydrocolloids, to methods of preparing them and their application in food microbiological protection.

Due to their composition, food products are susceptible to act as a culture medium for microorganisms, and this constitutes a possible risk to human health. Thus, food products require good protection against microbiological contamination.

Despite the need for the food industry to avoid the use of preservative products by means of good manufacturing practices, as described in national and international regulations, it is often necessary to warrant the necessary storage capability of the produced food-stuff, but without hiding defective effects of a manipulation or manufacture technique.

Often microbiological contamination of correctly manufactured food products is produced by external influences during storage or manipulation. So external barriers are employed to prevent this, and as a consequence lower amounts of internal preservative substances are required to achieve the necessary protection.

These barriers are physical and, in some cases, chemical ones. Physical non-porous impermeable barriers are the most effective. There exist however many food-stuffs which need to exchange humidity or flavours with the environment during storage, such as in some meat and cheese products, and to make this possible the physical barriers ought to be porous and permeable. This allows microorganisms to cross the barrier and to proliferate as for instance fungi do. In such cases, chemical barriers alone, or combined with physical ones, are useful to protect food from external microbiological contamination.

Among physical barriers other than package are plastic polymer and copolymer coatings, as polyvinyl, polyacrylate, polyester, polyamide and polyether coatings, natural and synthetic elastomer and rubber coatings, waxy coatings, cellulosic coatings and hydrocolloidal polymer coatings, as alginates, carrageenans, xanthan/locust bean gums mixtures, agars, gelatines and pectins.

Chemical barriers may be applied on the surface of the food stuff itself, dispersed in a solution or contained in a coating polymer suspension, solution or molten mix, with other components such as pigments, antioxidants, thickenings, oils, jellying agents, solubilizers, emulsifiers, flavours or opacifiers. The coatings are dried or solidified to be fixed. Some of the chemical compounds used in the chemical barriers are sorbates, benzoates, sulphur-derived compounds, nitrites, nitrates, propionates, lactates, acetates, borates, parabens, nisin and natamicin.

A cationic preservative derived from lauric acid and arginine, in particular, the ethyl ester of the lauramide of the arginine monohydrochloride, hereafter named LAE, has been developed for the protection against the growth of the microorganisms and may be used as a chemical barrier for surface protection in usual manners. The chemical structure is described in the following formula:

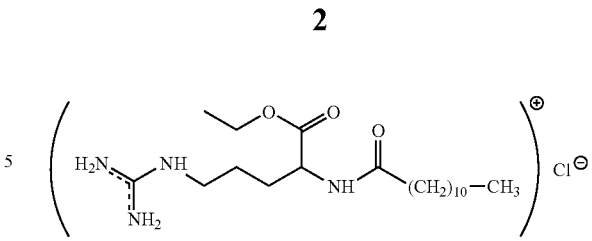

The preparation of this product has been described in Spanish patent application ES-512643 and international patent applications WO96/21642 and WO01/94292.

Biological studies carried out at different research centres under supervision of the applicant, showed that LAE acts mainly over the external and cytoplasmatic membrane of the microorganisms and, also, into the cytoplasmatic media, preventing their proliferation. Its action depends on the kind of microorganism and on the exposure time.

Besides, its metabolism in rats has been studied showing a fast absorption and metabolisation into naturally-occurring amino acids and the fatty acid lauric acid, which are eventually excreted as carbon dioxide and urea. Toxicological studies have demonstrated that LAE is completely harmless to animals and humans.

Therefore, LAE and related compounds are particularly suitable to be used in the preservation of all perishable food products.

This compound is remarkable for its inhibitory action on the proliferation of different microorganisms, such as bacteria, fungi and yeasts.

It was the object of the present invention, to provide a further form for the application of LAE and related products which allows a stable and lasting preservation of food-stuffs and reducing at the same time the amount of preservative which is applied.

It is known that cationic compounds can interact with anionic substances in different manners. The present invention relates to the interaction between LAE and anionic hydrocolloids, such as modified cellulose, alginates, pectins, xanthan gums, carrageenans, acacia gums or agars. As a result of this interaction, some anionic hydrocolloids are able to absorb LAE and precipitate together by the enhancement of their lipophilic properties. These new solid compounds can be isolated by filtration and, surprisingly, retain the microbiological inhibitory activity of LAE. The solid compounds contain approximately stoechiometric amounts of LAE and the anionic hydrocolloid. The preferred solid compound is LAE/xanthan gum. The solid compounds are stable and can be stored under normal conditions of temperature and humidity for long periods of time.

So this solid composition may be considered as a new preservative system by itself and it can be used instead of LAE in such applications where LAE's physical and/or chemical stabilization and/or improvement in its activity is required for food-stuff preservation or for any other application where a protection against contamination of microorganisms is necessary, such as cosmetic or industrial ones.

The interaction with anionic hydrocolloids of the invention to afford new solid bioactive compounds and their applications relate to the general class of cationic preservatives derived from the condensation of fatty acids and esterified dibasic amino acids, according to the following formula:

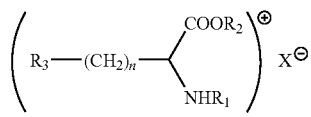

where:

X⁻ is Br⁻, Cl⁻, or HSO₄⁻

$R_1$: is a linear alkyl chain from a saturated fatty acid or hydroxyacid from 8 to 14 atoms of carbon, bonded to the α-amino acid group through an amidic bond.

$R_2$: is a linear or branched alkyl chain from 1 to 18 carbon atoms or an aromatic group.

$R_3$: is:

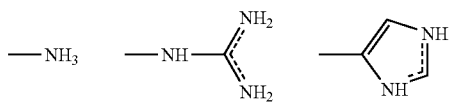

and n can be from 0 to 4.

The most preferred compound of the above class of compounds is LAE.

Depending on the application way, it is possible to achieve insoluble structures as clouds, filaments, films or liquid-filled coated shapes. The solid can be dispersed in a suitable liquid and added to the foodstuff. In most cases the suitable liquid is water, for instance when using the preferred solid LAE/xanthan gum this is prepared as a dispersion in water.

In an alternative manner, it is also possible to prepare a protective coating of the solid compound In situ by applying separate solutions of the anionic hydrocolloid and LAE or related compound. Thus, coatings are obtained when a surface is covered in a first step by a layer of hydrocolloid solution or dispersion in water and then treated in a second step with LAE, preferably solubilized or dispersed in water, ethanol, propylene glycol, isopropyl alcohol, other glycols, mixtures of glycols or mixtures of glycols and water solution. If the treatment shall be performed at a specific pH value, the use of a corresponding buffer solution may be recommendable.

The hydrocolloidal solution may contain between 0.1% and 10% of the hydrocolloid, preferably between 0.2% to 1% for xanthan gum. The LAE solution may contain between 0.01% to 30% of LAE, preferably between 0.05% to 0.5% when xanthan gum is employed.

The film forming solutions or dispersions may be performed by surface spraying, immersion or painting for coating applications.

This method afford a white translucent, flexible and rather resistant, wet coating with a wide microbiological spectrum of inhibitory activity. But it does not constitute a barrier for water or flavour interchange between product and outside medium. Moreover, toxic solvents or thermal treatments are not used in the formation of the film.

Film formation is quicker when thinner layers of hydrocolloidal solution and higher amounts of LAE are employed. Films are stronger when thicker layers of hydrocolloidal solution and higher amounts of LAE are employed. For immersion forming methods, longer immersion time in LAE solutions increases film strength, so 1 to 10 minutes of immersion time may be used, preferably 2 minutes for a 0.01% to 0.5% LAE solutions. The film formed may contain until a 30% of LAE after water washing.

The coating composition optionally comprises auxiliary components and excipients. Such auxiliary components and excipients can be thickening agents (e.g. guar gum, modified starches), anti-foam agents (e.g. dimethylpolysiloxane, silicon dioxide), products to obtain the optimal pH value (e.g. phosphates, tartrates, citrates, lactates), colouring agents (e.g. curcumin, tartrazine, erythrosine), and aroma products. It also may contain other preservatives and bioactive systems to increase microbiological protection, such as sorbates, benzoates, sulphur derived compounds, nitrites, nitrates, propionates, lactates, acetates, borates, parabens, nisin and natamicin.

It is particularly preferred to use the inventive preservative compounds and coatings for the preservation of food products, like for instance meat, poultry products, fish, crustaceans, vegetables, greens, emulsions, sauces, confectionery, bakery, pre-cooked meals, ready-to-serve meals, dairy products, egg-based products, jams, jellies, beverages, juices, wines and beers.

Moreover, the intended use relates to: wine-based flavoured drinks including products; non-alcoholic flavoured drinks; liquid tea concentrates and liquid fruit and herbal infusion concentrates; Barley Water; fruit and citric juices; Capilé Groselha; grape juices, unfermented, for sacramental use; wines, alcohol-free wines, fruit wines (including alcohol-free), alcoholic drinks with fruit; made wines, fruit sparkling wines, ciders, beers and perries (including alcohol-free); fermentation vinager; sod, saft; mead; spirits with less than 15% alcohol by volume; fillings of ravioli and similar products; quince, jams, jellies, marmelades and other fruit based spreads, candied, crystallized and glacé fruit and vegetables; sugar, glucose syrup, molasses and other sugars; transformed and dried fruits and vegetables, Frugtgrod and Rote Grütze, fruit and vegetable preparations (including fruit-based sauces); vegetable flesh; shell fruits; mousse, compote; salads, fruits and similar products, canned or bottled; Mostarda Di Fruta; Mascarpone; fruit based cake fillings; fruit gelling extracts and liquid pectine; vegetables and fruits in vinegar, brine or oil; rehydrated dried fruits; dressed dried fruits; sweetcorn canned in vacuum; potato dough and pre-fried, sliced, transformed, frozen, deep-frozen and peeled potatoes; dehydrated potato flakes and granulated; gnocchi; polenta; olives and olive-based preparations; jelly coating of meat products (cooked, cured or dried); burger meat; heat-treated meat products, sausages, breakfast sausages, pickled porks, pates, Foie Gras, Foie Gras Entier, Blocs de Foie Gras; Sagu; Mehu and Makeutettu; Ostkaka; Pasha; Semmelknodelteig; Polsebrod and bollery Dansk; canned Flutes; gelatine; collagen based covers with a water activity of more than 0.6; salted meats, cured placenta, dried meat products; semi-preserved fish products including fish roe products, pickling, salted, dried fish, shrimps, cooked, Crangon crangon and Crangon vulgaris cooked; fresh, cooked, frozen and deep-frozen crusteacean; cheese, pre-packed, sliced, unripened and cured cheese, processed cheese, layered cheese and cheese with added foodstuffs; superficial treatment of cheese, fruits and vegetables; cheese substitute, meat substitute, fish substitute, crusteacean substitute; non-heat-treated dairy-based desserts, curdled milk, semolina and tapioca based desserts; liquid egg (white, yolk or whole egg), dehydrated, concentrated, frozen and deep-frozen egg products; pre-packed and sliced bread and rye-bread; partially baked, pre-packed bakery wares intended for retail sale, fine bakery wares with a water activity of more than 0.65; lowenergetic bread; dry-biscuits; cereal- or potato-based snacks and coated nuts; batters, confectionery, glucose syrup based confectionery, flour based confectionery with a water activity of more than 0.65, chewing gum; Christmas pudding, nougats and marzipans; clotted cream; toppings (syrups for pancakes, flavoured syrups for milkshakes and ice cream, similar products), fat emulsions, dressing salads, emulsified sauces, non-emulsified sauces; prepared salads, mustard, seasonings and condiments; liquid soups and broths; aspic, liquid dietary food supplements; pearl barley; dietetic foods intended for special medical purposes and starches; dietetic formulae for weight control intended to replace total daily food intake or an individual meal; and other food products where the use of preservatives became necessary and allowed by law.

The new solid hydrocolloid/LAE may be added to a final stage of the product to be preserved or it may be added to a initial stage which would have the advantage of treating the food product. It may be added as dry product to the product to be preserved, or in the form of a solution or dispersion.

Coating applications may be performed by superficial spraying, immersion or painting of the film forming solutions or dispersions, according to the techniques well known for a person skilled in the art.

EXAMPLES

The displayed examples are only a selection, and do not represent a restriction to the conditions, concentrations, hydrocolloids, solvents or application methods in other cases.

Example 1

This example compares activity of the solid obtained from xanthan gum and LAE in front of LAE.

A precipitate of xanthan/LAE is formed when 150 mL of a solution containing 1.3% of xanthan gum and 300 mL of a solution containing 0.3% of LAE are mixed. Then, 2.5 g of white solid are isolated by filtration. This solid contains 21% of LAE and exhibits the full activity of LAE, taking into account the content of the active compound in the precipitate, as it can be shown in table 1 through standard CMI evaluation for some microorganisms at the concentrations of 683, 512, 341, 256, 170, 128, 64, 32, 16 and 8 mg/L:

| Microorganism | 21% LAE (mg/L) | Xanthan/LAE (mg/L) |
|---|---|---|
| Staphylococcus aureus ATCC 6538 | 128 | 128 |
| Enterobacter aerogenes CECT 684 | 128 | 128 |
| Escherichia coli ATCC 8739 | 128 | 128 |
| Bacillus cereus ATCC 9634 | 128 | 128 |
| Pseudomonas aeruginosa ATCC 9023 | 256 | 128 |
| Salmonella typhimurium ATCC 16028 | 128 | 128 |
| Citrobacter intermedium CECT 401 | 128 | 128 |
| Aspergillus niger ATCC 14604 | 170 | 341 |
| Candida albicans ATCC 10231 | 128 | 341 |
| Rhodotorula ruba CECT 1158 | 128 | 128 |

Example 2

This example shows the coating with xanthan gum and LAE by immersion method over sausages and its protective activity:

Samples were prepared stuffing 50 g of ground meat into synthetic guts with 3 cm of diameter. They were immersed in a bath containing a 0.5% of xanthan gum for a moment and let drain for 10 minutes. Then, they were immersed in a bath containing a 0.2% of LAE with continuous stirring for 5 minutes and drained for 10 minutes more.

To test the effectiveness of the film formed, coated samples and control samples, without coating treatment, were externally inoculated by immersion into a Sabouraud broth bath inoculated with *Aspergillus niger* in such a way as the microbiological contamination in bath was around $10^3$ cfu/mL. Finally, they were placed into the drying chamber at 25° C. for evaluation.

No mould growing was observed in coated samples for 10 days while the control samples exhibited a notorius growing of *Aspergillus niger* at $3^{rd}$ day.

Example 3

This example shows the coating by painting/spraying method with xanthan gum and LAE over unripened cheese and its protective activity:

Pieces of cheese were used as samples. These samples were of 4 cm long, 4 cm wide and 1 cm high. They were painted with a solution of 1% of xanthan gum. Then, they were sprayed with a 0.5% of LAE solution.

To test the effectiveness of the film formed, coated samples and control samples, without coating treatment, were externally inoculated by immersion into a Sabouraud broth bath contaminated with *Aspergillus niger* in such a way as the microbiological contamination in bath was around $10^3$ cfu/mL. Finally, they were placed into the ripening chamber at 25° C. for evaluation.

No mould growing was observed in coated samples for 7 days while the control samples exhibited a important growing of *Aspergillus niger* after the $3^{rd}$ day.

Example 4

This example shows the coating by immersion method with xanthan gum and LAE over cooked jam and its protective activity:

Samples were prepared from cooked jam chopped in pieces of 4 cm long, 4 cm wide and 1 cm high. They were immersed into a solution of 0.75% of xanthan gum for a moment and let drain for 10 minutes. Then, they were immersed into a bath with 0.2% of LAE under continuous stirring for 5 minutes and then drained for 10 minutes more.

To test the effectiveness of the film formed, coated samples and control samples, without coating treatment, were externally inoculated by immersion into a buffered peptone water bath contaminated with *Staphylococcus aureus* in such a way as the microbiological contamination in bath was around $10^6$ cfu/mL. Finally, they were kept at 25° C. for evaluation.

No bacterial growing was observed in coated samples for 4 days while the control samples exhibited bacterial surface growing after the $2^{nd}$ day.

Example 5

This example shows a "in vitro" obtention of a coating by painting/immersion method with xanthan gum and LAE over Sabouraud agar cylinders and its protective activity:

Sabouraud agar cylinders of 5 cm long and 1.5 cm diameter were prepared. They were immersed into a solution of 0.75% of xanthan gum for a moment and let drain for 10 minutes. Then, they were immersed into a bath with 0.1% of LAE and continuous stirring for 5 minutes and then drained for 10 minutes more.

To test the effectiveness of the film formed, coated samples and control samples, without coating treatment were externally inoculated by immersion into a buffered peptone water bath contaminated with *Candida albicans* in such a way as the microbiological contamination in bath was around $10^6$ cfu/mL. Finally, they were kept at 25° C.

No yeast growing was observed in coated samples for 5 days while the control samples exhibited yeast surface growing after the $3^{rd}$ day.

The invention claimed is:

1. A solid preservative compound comprising (a) an anionic hydrocolloid and (b) a cationic preservative derived from the condensation of fatty acids and esterified dibasic amino acids, according to the following formula:

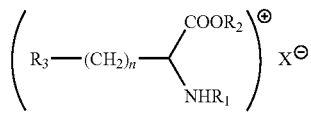

where:

$X^-$ is $Br^-$, $Cl^-$, or $HSO_4^-$ $R_1$: is linear alkyl chain from a saturated fatty acid, or hydroxyacid from 8 to 14 atoms of carbon bonded to the α-amino acid group through amidic bond;

$R_2$: is a linear or branched alkyl chain from 1 to 18 carbon atoms or aromatic group;

$R_3$: is:

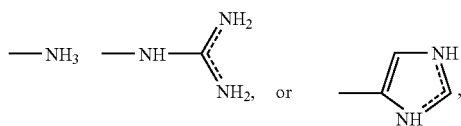

and n can be from 0 to 4 wherein (a) and (b) interact to form a solid precipitate compound that retains the microbiological inhibitory activity of the cationic preservative.

2. The solid preservative compound according to claim 1, wherein the cationic preservative comprises the ethyl ester of the lauramide of arginine hydrochloride (LAE).

3. The solid preservative compound according to claim 1, wherein the anionic hydrocolloid is chosen from agars, pectins, modified cellulose, alginates, carrageenans, acacia gum and xanthan gum, or a mixture of two or more thereof.

4. The solid preservative compound according to claim 1, wherein the hydrocolloid is xanthan gum.

5. A method for preserving food products, comprising the step of adding the solid preservative compound of claim 1 in solution, dispersion, solid or spray to a food product before, during and/or after manufacture of the food product.

6. The method of claim 5, wherein the solid preservative compound is applied as a surface treatment.

7. The solid preservative compound according to claim 1, wherein the solid preservative compound is a preservative for a food product, cosmetics, or industrial applications, where a microbiological protection would be necessary.

8. A food product comprising the preservative compound according to claim 1 as a preservative.

9. The food product of claim 8, wherein the solid preservative compound is at a concentration of from 0.001 to 3% by weight on the basis of the total weight of the food product.

10. A surface coating system for food-stuff cosmetics, or industrial applications, comprising the solid preservative compound according to claim 1.

11. A method for preserving a food product, the method comprising: in a first step, applying a hydrocolloid solution or dispersion in water to the surface of the food product; and in a second step, applying a solution of ethyl ester of the lauramide of arginine hydrochloride (LAE), in water, ethanol, propylene glycol, isopropyl alcohol, other glycols, mixtures of glycols or mixtures of glycols and water solution; wherein the hydrocolloid solution or dispersion and the LAE solution interact to form a film on the surface of the food product, wherein the film permits the food product to maintain the ability to exchange humidity or flavour with the environment during storage.

12. The method of claim 11, wherein applying the solution or dispersion is by surface spraying, immersion or painting.

13. The method of claim 11, wherein the hydrocolloidal solution comprises between 0.1% to 10% by weight of the hydrocolloid.

14. The method of claim 11, wherein the hydrocolloidal solution comprises between 0.2% to 1% by weight of the hydrocolloid.

15. The method of claim 11, wherein the ethyl ester of the lauramide of arginine hydrochloride (LAE) solution comprises between 0.01% to 30% by weight of LAE.

16. The method of claim 15, wherein the ethyl ester of the lauramide of arginine hydrochloride (LAE) solution comprises between 0.05% to 0.2% by weight of LAE.

* * * * *